Feb. 9, 1926.
A. U. WALTER
HORN BUTTON ATTACHMENT
Filed August 2, 1922       2 Sheets-Sheet 1
1,572,828
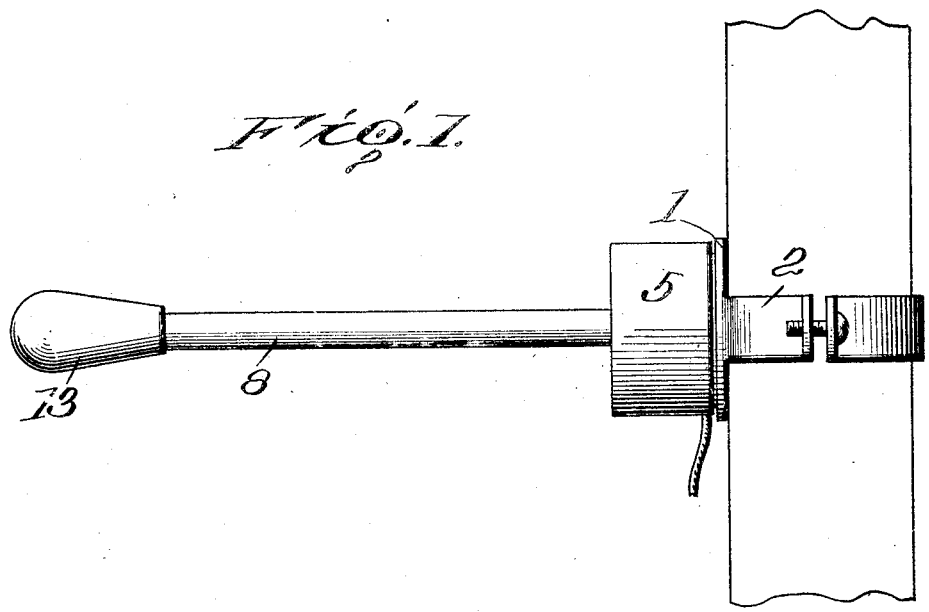
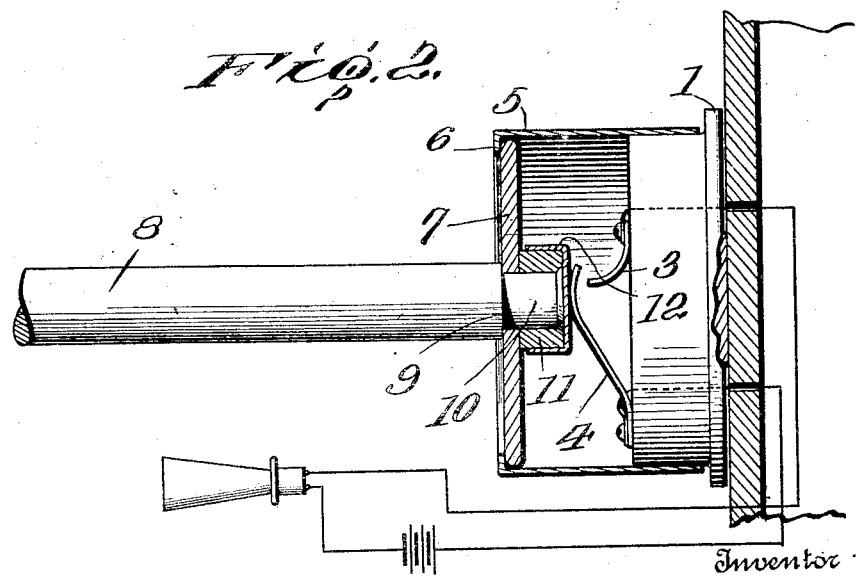
Inventor
ALBERT U. WALTER
Sturtevant & Mason  Attorneys Feb. 9, 1926.
A. U. WALTER
1,572,828
HORN BUTTON ATTACHMENT
Filed August 2, 1922    2 Sheets-Sheet 2
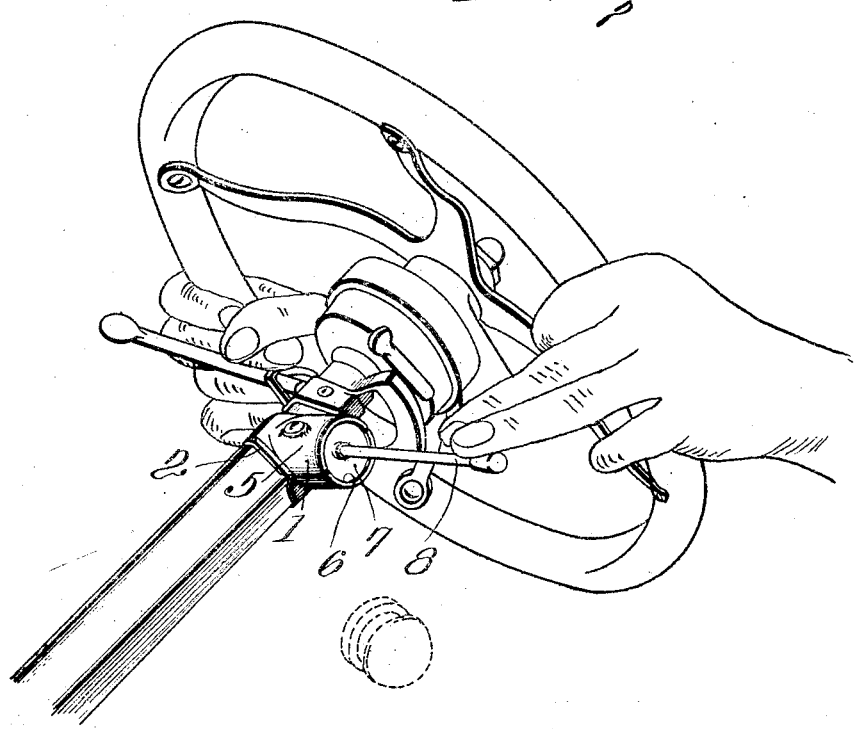
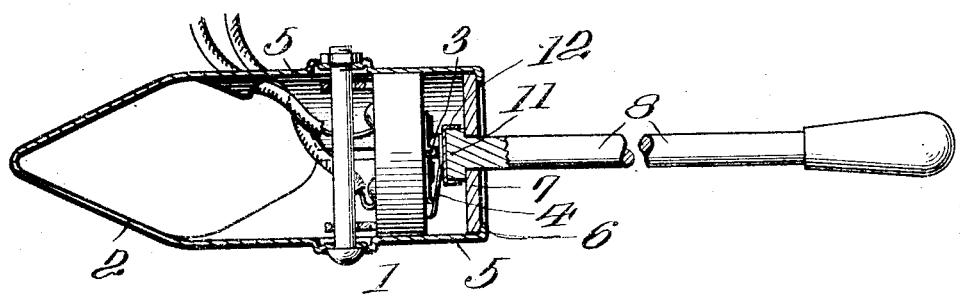
Inventor
ALBERT U WALTER
By Sturtevant & Mason
Attorneys Patented Feb. 9, 1926.

1,572,828

UNITED STATES PATENT OFFICE.

ALBERT U. WALTER, OF BALTIMORE, MARYLAND.

HORN BUTTON ATTACHMENT.

Application filed August 2, 1922. Serial No. 579,183.

*To all whom it may concern:*

Be it known that I, ALBERT U. WALTER, a citizen of the United States, residing at Baltimore, State of Maryland, have invented certain new and useful Improvements in Horn Button Attachments, of which the following is a description, reference being had to the accompanying drawing and to the figures of reference marked thereon.

The present invention relates to attachments for operating electrical horns and signal devices on automobiles, and while more particularly it has been devised for use in connection with Ford automobile horns, it will be understood that I do not wish to be limited thereto, as it is applicable to other types of signal operating devices.

The principal object of the invention is to provide a simple and comparatively cheap device to replace the present press button of a horn operated device, so that the horn or other signal can be sounded by the operator without removing his hand from the steering wheel.

A further object relates to the particular attachment as applied to a Ford automobile horn, the device being constructed and arranged to operate directly upon the spaced contacts of the Ford horn in lieu of the press button.

Further objects of the invention will be apparent from a perusal of the following specification when taken in connection with the accompanying drawings, in which—

Figure 1 is a perspective view of the device shown attached to a conventional representation of the steering column of an automobile;

Fig. 2 is a cross sectional view of the same with portions broken away;

Fig. 3 is a perspective view of a Ford steering wheel and steering column with my improved attachment applied thereto, the detachable figure shown in connection with this Fig. 3 representing the usual Ford press button which my invention replaces, and Fig. 4 is a cross section illustrating my attachment complete.

Referring now more particularly to the accompanying drawings, Fig. 1, the device comprises the usual base 1 provided with a clamping ring 2 so that it can be attached to the steering column of the automobile, which in the present drawing, is shown conventionally. Obviously, this base can be constructed so that it is attachable to any convenient portion of the automobile in lieu of the steering column. This base 1 carries the spaced contacts 3 and 4 suitably electrically insulated and connected to the horn circuit shown diagrammatically in Fig. 2. These contacts are enclosed in an open-ended sleeve 5 which fits over the base 1. This sleeve 5 at its open upper end is provided with a peripheral inwardly turned retaining flange 6. All of the foregoing is of the usual construction.

This retaining flange 6 heretofore has been used to loosely hold in place the ordinary push button so that when the push button is pressed inwardly, it presses the contacts 3 and 4 together to sound the horn.

The present invention resides in providing a cheaply made and simple device adapted to act as a substitute for this push button and to be retained loosely in place by this retaining flange 6 just as the push button is; the main object being to construct this device so that when the housing sleeve 5 is taken off, the push button can be taken out and the device substituted in lieu thereof. To this end, the invention comprises a plate 7, preferably of metal, but of any desired material, centrally bored to receive the operating lever 8 also of any desired material. This operating lever is preferably affixed thereto by providing the same with a shoulder 9 which forms the extreme end 10 of smaller diameter. This end 10 passes through a central aperture of the plate 7 and is attached thereto by means of a washer 11 which may be swaged thereon, or the operating lever 8 may be attached to the plate 7 by threading the end 10 of the same and holding it in place by means of a nut in lieu of the washer 11. In any event, the end 10 which passes through the plate 7 constitutes a projecting portion of the operating plate 7 and is in turn provided with a cap 12 of suitable material, preferably of insulating material. The lever 8 is preferably relatively long and provided on its outer end with a handle 13.

By means of the above construction, it will be noted that since the plate 7 fits within the circular housing 5 and is retained loosely by the flange 6, the movements of the lever 8 in any direction will swing the plate about a corresponding axis and will press the projecting end 10, which normally lies or bears against the contact spring 4, inwardly to thereby close the contact spring 4 and sound the signal. It will be noted that this device is a simple one-piece construction, cheaply made and can be quickly inserted in place of a push button.

The particular construction of this attachment as applied to a Ford automobile is illustrated more particularly in Figures 3 and 4. The steering column, steering wheel and contact enclosing casing which is clamped to the steering column is of the usual construction. The other parts forming the attachment which is the subject of my invention, are indicated by reference numerals similar to those used in Figures 1 and 2. In Fig. 4, I illustrate a slight variation in the construction of the operating lever 8 which tends toward cheapness and convenience of production in that the rod or lever 8 has a head 11 upset thereon and the insulator 12 is secured thereto.

It is obvious that minor changes in the details of construction and the arrangement of the parts may be made without departing from the spirit of the invention as set forth in the appended claim.

Having thus described the invention, what I claim as new and desire to secure by Letters Patent, is—

An attachment adapted to replace the ordinary push button of an automobile horn controlling switch, including a plate constructed and arranged to replace the button of the switch and to be loosely retained in place adjacent the contacts of the switch by the button retaining flange of the usual housing enclosing the contacts of the switch, one of said contacts being yielding and operating to normally hold the plate in contact with the flange, said plate having rigidly attached thereto, centrally thereof, a relatively long operating lever, which lever projects outwardly through the open end of the housing when the plate is positioned therein to a convenient point for operation, said plate fulcruming at any point on the retaining flange for closing the contacts when said lever is operated in any direction.

In testimony whereof, I affix my signature.

ALBERT U. WALTER.